(12) United States Patent
Krauter et al.

(10) Patent No.: US 6,383,388 B1
(45) Date of Patent: May 7, 2002

(54) **WATER TREATMENT PROCESS AND SYSTEM FOR METALS REMOVAL USING *SACCHAROMYCES CEREVISIAE***

(75) Inventors: Paula A. W. Krauter; Gordon W. Krauter, both of Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 1092 days.

(21) Appl. No.: 08/805,005

(22) Filed: Feb. 12, 1997

Related U.S. Application Data

(63) Continuation of application No. 08/512,496, filed on Aug. 8, 1995.

(51) Int. Cl.[7] .................................................. C02F 3/34
(52) U.S. Cl. ........................ 210/611; 210/688; 210/913; 210/205; 435/262.5; 435/942
(58) Field of Search ................................. 210/610, 611, 210/620, 688, 747, 912, 913, 914, 205; 435/262, 262.5, 264, 942

(56) References Cited

U.S. PATENT DOCUMENTS

| | | | |
|---|---|---|---|
| 3,769,164 A | * 10/1973 | Azarowicz | 435/942 |
| 4,385,121 A | 5/1983 | Knowlton | 435/244 |
| 4,508,824 A | 4/1985 | Olsen | 435/234 |
| 4,530,763 A | * 7/1985 | Clyde et al. | 210/913 |
| 4,530,846 A | * 7/1985 | Nagodawithana et al. | 435/942 |
| 4,789,481 A | * 12/1988 | Brierley et al. | 210/688 |
| 4,910,143 A | 3/1990 | Vandenbergh | 435/252.34 |
| 4,936,996 A | * 6/1990 | Messing | 210/611 |
| 4,954,258 A | 9/1990 | Little | 210/611 |
| 5,018,576 A | 5/1991 | Udell et al. | 166/272 |
| 5,055,402 A | * 10/1991 | Greene et al. | 210/688 |
| 5,128,262 A | 7/1992 | Lindoerfer et al. | 435/264 |
| 5,155,042 A | * 10/1992 | Lupton et al. | 210/611 |
| 5,160,488 A | 11/1992 | Stillman | 435/262.5 |
| 5,173,413 A | * 12/1992 | Coughlin et al. | 435/942 |
| 5,265,674 A | 11/1993 | Fredrickson et al. | 166/246 |
| 5,354,688 A | * 10/1994 | Francis et al. | 210/611 |
| 5,425,881 A | 6/1995 | Szejtli et al. | 210/747 |
| 5,441,641 A | * 8/1995 | Vail et al. | 210/611 |

\* cited by examiner

*Primary Examiner*—Christopher Upton
(74) *Attorney, Agent, or Firm*—L. E. Carnahan; Alan H. Thompson

(57) ABSTRACT

A process and a system for removal of metals from ground water or from soil by bioreducing or bioaccumulating the metals using metal tolerant microorganisms *Saccharomyces cerevisiae*. *Saccharomyces cerevisiae* is tolerant to the metals, able to bioreduce the metals to the less toxic state and to accumulate them. The process and the system is useful for removal or substantial reduction of levels of chromium, molybdenum, cobalt, zinc, nickel, calcium, strontium, mercury and copper in water.

33 Claims, 5 Drawing Sheets

WATER TREATMENT PROCESS AND SYSTEM FOR METALS REMOVAL USING *SACCHAROMYCES CEREVISIAE*

This is a continuation of copending application of Ser. No. 08/512,496 filed on Aug. 8. 1995.

The United States Government has rights in this invention pursuant to Contract No. W-7405-ENG-48 between the U.S. Department of Energy and the University of California, for the operation of Lawrence Livermore National Laboratory.

BACKGROUND OF THE INVENTION

1. Field of Invention

This invention concerns a process and a system for removal of heavy metals from water or soil using metal tolerant microorganisms. In particular, this invention concerns a water treatment process and system for removal of metals from ground water or from soil by reducing or bioaccumulating the metals using metal tolerant *Saccharomyces cerevisiae*. The invention further concerns a process for bioreduction and bioaccumulation of the chromate using chromate tolerant *Saccharomyces cerevisiae*. The system and its basic functional flow diagram is provided which separates the metals from the water. The invention is particularly useful for removal or substantial reduction of levels of chromium, molybdenum, cobalt, zinc, nickel, calcium, strontium, mercury and copper in water.

2. Background Art and Related Art Disclosures

Metal-refining industries, mining operations, and manufacturing industries produce wastes that may contain metals. Occasional leaching of the waste solids by rain percolation or surface water runoff has been a source of contamination of the ground and surface water.

Of the metals, chromium is one of the most common contaminate. Chromium is used in plating shops, tanneries, and aerospace facilities, and has been found in the effluent of facilities with water towers and steam generators as well as in mine tailings. Epidemiological data suggest that chromium compounds are carcinogenic in humans (*Br. J. Industr. Med.*, 13:260 (1956); *Arch. Biochem. Biophys.*, 290:381 (1991). Studies described in Nature, 250:493 (1974) provide evidence that hexavalent chromium [Cr(VI)] salts, sodium, potassium and calcium are mutagenic.

The concentrations of hexavalent chromium is subject to ground water mandated discharge requirements. Hexavalent chromium Cr(VI) is monitored in ground water because it is toxic, and carcinogenic. It is also a very strong oxidizing agent. Cr(VI) is difficult to remove from ground water because of its high solubility at neutral pH. In its hexavalent form, chromium can be absorbed, sorbed or taken up by cells and cause toxic reactions. Chromium in the trivalent state is less toxic because at neutral pH it will precipitate as a hydroxide and will not be assimilated or taken up by cells. Because of its higher toxicity, the amount of hexavalent chromium is regulated. As set by the National Pollutant Discharge Elimination System, an allowable discharge limit for hexavalent chromium is only 11 ppb while trivalent chromium has an allowable discharge limit of 50 ppb.

Typical methods currently available for removing chromium are (1) chemical reduction with sodium metabisulfate, ferrous sulfate, or hydrogen peroxide; or (2) ion exchange. The ion-exchange method uses a polymer resin in which anions attach to the polymer and are exchanged with the Cr(VI) in solution. Potential problems associated with these methods include the cost of the resin and plugging of the resin-containing filter bed. Before the chemically treated water can be released at the surface, the sodium metabisulfate needs to be removed and the pH needs to be adjusted back to neutrality. Both method, are costly and contribute to additional toxic wastes.

It would, therefore, be highly advantageous to have available a method for removing or reducing chromium and other metals in ground water to levels established as acceptable by National Pollutant Discharge Elimination System (NPDES), utilizing a common nonpathogenic microorganism for such removal.

Several species of bacteria, yeast, and algae are known to be capable of accumulating metal ions extracellularly or internally to concentrations several orders of magnitude higher than the background concentration (*J. Indust. Microbiol.*, 14:159 (1995). Pseudomonas species have been studied and characterized for chromate reductase activity as described in *Appl. Environ. Microbiol.*, 56:2268 (1990). Although *P. aeruginosa* and *P. fluorescens* were shown successfully to remove Cr(VI) from ground water (unpublished results), these organisms also tainted the water with an unpleasant odor. Additionally, *P. aeruginosa* is a human pathogen and it is preferred not to use it for water treatment.

As described in *J. Gen. Microbiol.*, 99:317(1977), and in *Appl. Environ. Microbiol.*, 41:237 (1981), *S. cerevisiae* has been shown to be capable of accumulating cobalt ($Co^{2+}$) and ($Cd^{2+}$), cesium (Cs), strontium (Sr), and uranium (U). Copper [Cu(II)] and chromium ($Cr^{2+}$) are also accumulated by *S. cerevisiae* (*J. Ind. Microbiol.*, 7:97 (1991); *Water Res.*, 24:433 (1990); *Appl. Environ. Biotechnology*, 41:149 (1994).

Microorganisms interact with metals by a number of processes, including transport, biosorption to cell biomass, entrapment in extracellular capsules, precipitation, and oxidation-reduction reactions as described, for example, in *Experientia*, 46:834 (1990) or in Metal Tolerance in *Microbiology of Extreme Environments*, Ed. C. Edwards, Open University Press, Milton Keynes, 178–210 (1990). Bioaccumulation of metal cations has been demonstrated by a process of an initial rapid accumulation that is independent of metabolism and temperature, and by a metabolically mediated process that internalizes the cation into the cell. These two processes are described in *J. Gen. Microbiol*, (supra) and *Appl. Environ. Biotechnology* (supra). Energy-dependent uptake of divalent cations by *S. cerevisiae* is described in *Biochem. Biophys. Acta*, 163:325 (1968) and in (*J. Ind. Microbiol.*, 7:97 (1991) with influx being dependent on the electrochemical proton gradient across the plasma membrane as described ibid, at 650:88 (1981).

Removal of the metals from contaminated or polluted ground water or soil using the reduction or bioaccumulation of these metals by the metal tolerant microorganisms, including *S. cerevisiae*, has not been previously disclosed.

It is therefore a primary object of this invention to provide an effective and inexpensive process for removal of metals from ground water using the fermentative microorganism *S. cerevisiae*.

All cited patents, patent applications and publications are hereby incorporated by reference.

SUMMARY

One aspect of the current invention is a process for removal or a substantial reduction of metals from polluted ground water or from leached soil.

Another aspect of the current invention is a process for removal or a substantial reduction of metals from polluted ground water using yeast *Saccharomyces cerevisiae*.

Still another aspect of the current invention is a process where the removal of a metal from water is achieved by bioreduction of the metal, or by accumulation and separation of the metal from the water using Saccharomyces cerevisiae.

Still yet another aspect of the current invention is a process for removal of metals from water utilizing *Saccharomyces cerevisiae* for accumulation and removal of the metals in a bioreactor which handles large volumes of water and separates chromium species accumulated in cells from water.

Yet another aspect of the current invention is a process for removal of toxic hexavalent chromium from the ground water by reducing the hexavalent chromium to trivalent chromium which is less toxic, can be precipitated as a hydroxide and is not assimilated by cells.

Still yet another aspect of the current invention is a process for removal of metals from water utilizing *Saccharomyces cerevisiae* for accumulation and removal of the metals in a bioreactor which handles large volumes of water and separates a metal accumulated in cells from water.

Still yet another aspect of the current invention is a process for removal of metals from the ground water wherein the metal is chromium, cobalt, copper, zinc, strontium, mercury, molybdenum or nickel.

DEFINITIONS

As used herein:

"Yeast" or "yeast culture" means a culture of *Saccharomyces cerevisiae*.

"Chromate" is a form of chromium and means hexavalent chromium.

"Biomass" means a mass of biological material, in this case *Saccharomyces cerevisiae* and may contain living cells, dead cells or a mixture thereof.

DETAILED DESCRIPTION OF THE INVENTION

The current invention concerns a process for rapid, efficient and economical removal or a substantial reduction of concentration of metals from contaminated ground water by bioaccumulation or bioreduction using *S. cerevisiae*.

The process utilizes bioreduction of the metal into its less toxic form and/or bioaccumulation of the metal by the metal tolerant nonpathogenic yeast *S. cerevisiae*. *S. cerevisiae* cells are tolerant and resistant to metals. The cell metal tolerance mechanism is viewed to be either plasmid-borne, due to a reduced cell wall permeability or due to their ability to reduce the metal to its less toxic form.

For a large scale removal of metals from the contaminated ground water or from the water of the leached contaminated soil, the process utilizes biomass of *S. cerevisiae* in a bioreactor system able to handle large volumes of water. The process and the bioreactor system are described in FIGS. 1 and 2.

The process and the system is useful for removal of metals, such as chromium, molybdenum, cobalt, zinc, nickel, calcium, strontium, mercury and copper from the water or leached soil.

The process of the invention disclosed herein is representatively illustrated by using *Saccharomyces cerevisiae* biomass for reduction of hexavalent Cr(VI) to trivalent Cr(III). Discovered bioaccumulation of the chromium within the *Saccharomyces cerevisiae* biomass and detected bioreduction of hexavalent to trivalent chromium serves as a representative example of the current invention feasibility to remove completely or to substantially reduce concentrations of metals in water or soil.

I. A Process for Removal of Metals from Ground Water

Figure 1:
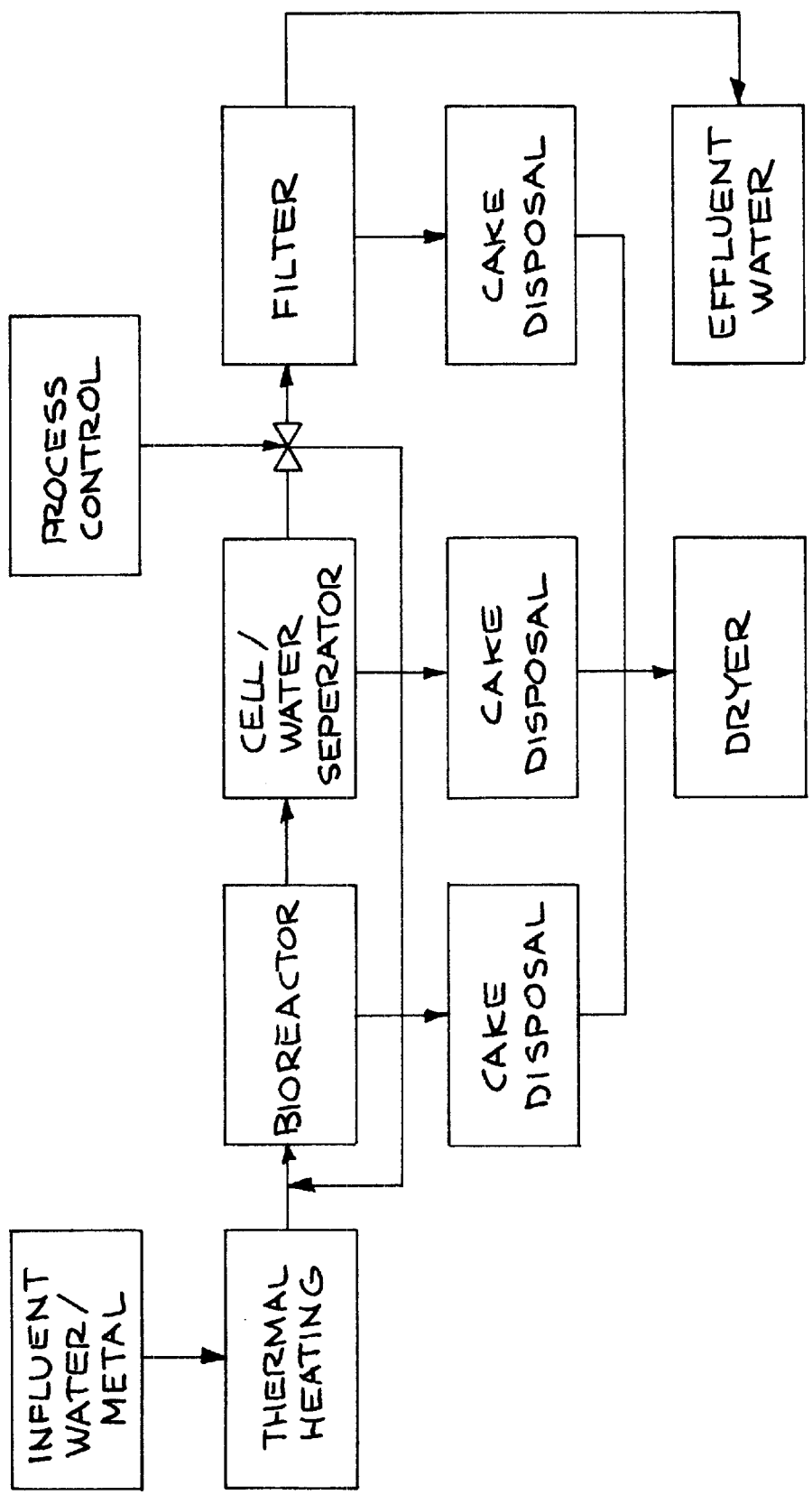
FIG. 1 depicts basic components of the water treatment process for metal removal using *S. cerevisiae*.

The process of the invention comprises several essential steps and conditions which are illustrated in FIG. 1.

Generally, the metal contaminated water is heated to temperatures from about 15° C. to about 45° C., preferably to a temperature between 25° C. and 35° C. and most preferably to about 30° C. However, lower and higher temperatures are also intended to be within the scope of the invention. *S. cerevisiae* biomass of living cells, dead cells or a mixture thereof, preferably the living cell biomass is added to the water in amount from about 2 g/L to about 100 g/L of cell dry mass or higher up to a point of slurry, preferably in amount from about 4 to about 15 g/L, most preferably about 8 g/L of treated ground water. The amount of cell biomass will depend on degree of metal contamination, on temperature used, on water pH and on other process conditions. The treated water may be naturally buffered or any suitable buffer or buffering compound, such NaOH, carbonate, bicarbonate or phosphate buffers known in the art may be used for pH adjustment. The process is run at pH from about 2 to about 9 or higher, preferably at neutral pH from about 6.5 to about 7.8. Additionally, carbon source, such as any suitable sugar, preferably glucose is added in amount from about 10 to about 1000 mM, preferably about 50 to about 500 mM, most preferably about 100 mM.

The process can be run under aerobic or anaerobic conditions, with anaerobic conditions being preferred. The treatment is run from about 4 hours to about 100 hours, preferably for about 24 to 48 hours, during which time the metal is biodegraded or bioaccumulated and precipitates and is collected at the bottom of the treatment container from which it is removed by filtration. Metal can be additionally removed by centrifugation. Cell biomass containing bioaccumulated metal can be removed as a cake and properly disposed.

For large scale handling of ground water, a bioreactor system described in greater details below has been developed.

Briefly, the water containing metal is warmed and placed in contact with *S. cerevisiae* in the bioreactor where the metal is bioreduced or bioaccumulated in the cells and attached to the bioreactor wall and/or interior. The cell and metal complexes are precipitated and separated from water in a separator. Before the treated water is discharged, a control step is introduced to verify metal concentration by means known in the art water is recirculated through the system. If necessary, treated water pH, turbidity, and Biological Oxygen Demand is monitored.

FIG. 1 illustrates basic steps of the water treatment process for metals removal using S. cerevisiae. The influent water polluted with metal is heated to a temperature about 25 to 35° C. and buffered, and introduced into a bioreactor. The bioreactor contains a S. cerevisiae culture, in biomass concentration about 8 g/liter of water. A carbon source is added, preferably glucose in amount about 100 mM. Water treatment proceeds for 24 to 48 hours. The metal is than precipitated and the precipitate or the metal/cell complex is removed.

II. A Bioreactor System for Removal of Metals from Water

The bioreactor system utilizing a process of the invention was tested in the laboratory.

Figure 2:
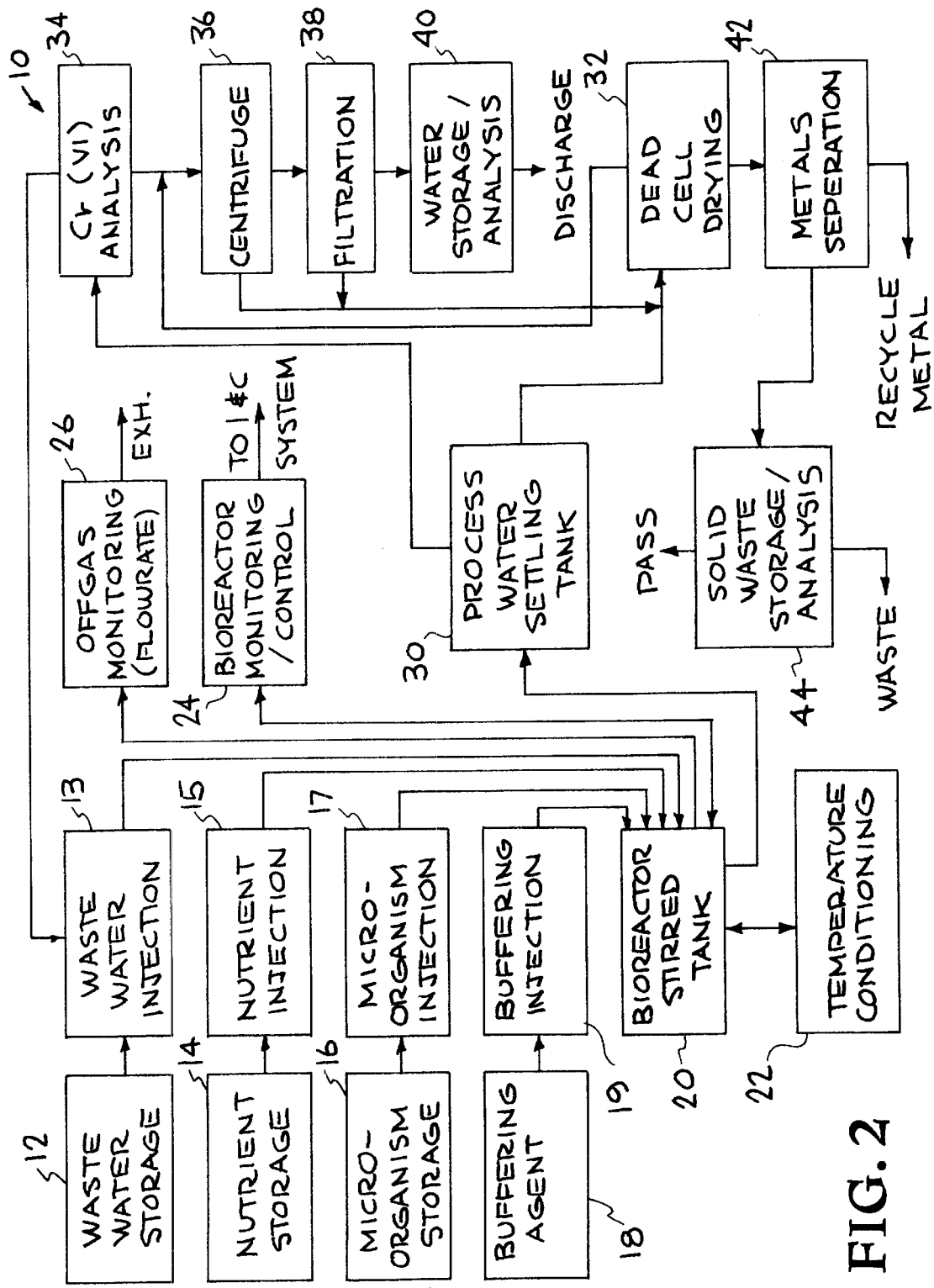
FIG. 2 is a functional flow diagram for a bioreactor basic system for removing hexavalent chromium from ground water by *S. cerevisiae*.

A stirred-tank batch reactor was selected for studying the effects of various operating parameters on the process. The stirred-tank reactors are typically used to obtain the basic data required to understand the chemistry and microbiology aspects of the investigated solutions. They produce consistent results, attain equilibrium conditions quickly, and are easily controlled. Based on prior studies and observations, a bioreactor system of the invention was developed as seen in FIG. 2. It is to be understood, however, that any other system or modification thereof whether or not consisting of all components shown in FIG. 2 as long as it performs in substantially the same way the functions according to the disclosed invention, are intended to be within the scope of the invention.

The system of the invention is suitable for removal of metals from and decontamination of large volumes of the ground water. Functional flowsheet diagram represented in FIG. 2 shows an industrially useful system for metal decontamination according to the invention.

Briefly, the main components of the bioreactor system include injection systems, stir-tanks, settling tanks, separation systems and storage tanks.

The function of the injection systems is to control and monitor the introduction of the waste water, microorganisms, nutrients and buffering agents into the stir-tank. The injection systems consist of several independently operated, close loop control subsystems where each subsystem is optimized for the specific feedstocks. The water injection system consists of a metering pump, control valves and flow meter to control the rate of the incoming waste water. The nutrients, buffering agents and microorganism injection systems are solids handling systems. They control and monitor the solids entering the stir-tank using metering pumps and valves. The amounts of solids injected are determined by either weight or volume measurements. All of the injection systems are controlled by a supervisory control system.

The stir-tank reactor is a large insulated tank with a stirring paddle. There is a temperature conditioning unit that provides heating and cooling as required to maintain the reactor at the set-point. The biological reduction in the tank is monitored and water samples are periodically analyzed. The reactor is vented and the off gas flow rate is used to monitor the bioreaction. After the batch operation, the reactor is drained into a settling tank.

The dead cells and metal complex occupies the lower portion of the settling tank. The processed water is removed from the settling tank and tested for chromium. If the chromium concentration is acceptable, the water is centrifuged and filtered to remove any solid material and stored in a tank until it is analyzed and its metal levels certified to be acceptable before reinjection into the aquifer. The solids that are removed by the centrifuge or filter are combined with the dead cells from the settling tank.

All of the solids are dried to remove residual water. The dry solids are processed to remove the metals with a separation step. The metals are either reclaimed and sent for recycling or stabilized and disposed of as a nonhazardous waste. The dead cells without the metal can be used as fertilizer feedstocks or disposed of as nonhazardous waste.

In greater detail, the system 10 shown in FIG. 2 consists of waste water storage 12 connected to waste water injection container 13 which is connected to a bioreactor stir-tank 20. The system further consists of a nutrient storage 14 containing a sufficient supply of nutrients to sustain the growth of the microorganism, in this case S. cerevisiae. The nutrient storage is connected to nutrient injection container 15 which is also connected to the bioreactor stir-tank 20. A microorganism storage 16 is connected to a microorganism injection container 17 which is connected to the bioreactor 20. The container 18 stores a buffering agent for pH control. The container 18 is connected to a buffering injection container 19 connected to the bioreactor 20. Temperature of the bioreactor 20 is controlled using the temperature conditioning unit 22. Bioreactor monitoring unit 24 and off-gas monitoring unit 26 monitor various conditions within the bioreactor, and use this data to control units 13, 15, 17 and 19.

The contaminated waste water stored in waste water container 12 is injected into the bioreactor where it is mixed by stirring with the microorganism, buffered and warmed. Stirred water mixed with microorganism cells is moved to a process water settling tank 30 where the dead microorganism cells and cell/metal complexes and precipitates are settled at the bottom and moved to the unit 32 where the cells undergo a drying process. Water from the settling tank 30 is moved through the metal analysis unit 34, separated in the centrifuge 36, passed through a filter 38 and transported to a water storage tank 40. After analysis for metal concentration and other contamination, the water is discharged provided that the metal levels in the water do not exceed acceptable levels. Water from the dead cell drying unit 32 is passed to the centrifuge 36, filtered in the filter 38 and passed to the water storage 40. Dead cells containing the metal, or complexed with metal, or precipitated metals are moved, as solids, to metal separation unit 42 where the cells are separated from the metal and the metal is recovered and recycled. Cell mass remaining in the metals separator 42 is moved to a solid waste'storage 44 and disposed of as a hazardous waste, moved to a landfill or used as a fertilizer, depending on the metal content.

The same process for metal removal from the ground water is used for removal of metals from the water leached from the contaminated soil. The soil is leached according to method developed by A. J. Francis, U.S. Pat. No. 5,047,192 (1991) and the leached water is submitted to the current process.

II. A Process for Removal Metals from Ground Water

The process for removal or substantial reduction of metals of the invention was tested and its efficiency and feasibility confirmed by studies performed on the water contaminated with chromium.

The process conditions were optimized by testing several variables, such as the effect of pH, temperature, air, glucose concentration as well as S. cerevisiae sensitivity to Cr(VI). Rate of chromate removal was determined in view of these variables.

Conditions for studies using these variables are described in Example 4.

A. Effect of pH on Cr(VI) removal

The removal of Cr(VI) under varying pH conditions was different for the live S. cerevisiae culture (LC) than for dead S. cerevisiae culture (DC). Results are seen in Tables 1 and 2.

Table 1 shows Cr(VI) removal by live S. cerevisiae biomass at several pH values. S. cerevisiae concentration was 1.5 g/L, glucose concentration was 50 mM, Cr(VI) concentration was 2 mg/L in MW-004 ground water. The pH w as adjusted with 2 N HCl. The ambient test temperature was 20° C. The exposure at this temperature was 24 hours.

TABLE 1

| Initial pH | Final pH | Initial [Cr(VI)] (mg/L) | Final [Cr(VI)] (mg/L) | Cr(VI) removal (%) |
|---|---|---|---|---|
| 2.0 | 2.0 | 2.11 | 0.77 | 61 |
| 4.0 | 3.1 | 1.91 | 0.38 | 81 |
| 5.0 | 3.8 | 1.91 | 0.35 | 82 |
| 6.1 | 3.9 | 1.96 | 0.21 | 89 |
| 6.5 | 4.0 | 1.84 | 0.00 | 100 |
| 7.0 | 4.4 | 1.85 | 0.00 | 100 |
| 8.2 | 4.9 | 1.96 | 0.67 | 67 |

As seen from Table 1, the optimum pH for S. cerevisiae for removal of Cr(VI) from solution was near neutrality. Between pH values of pH 6.5 and 7.0, 100% Cr(VI) was removed from the ground water samples by live S. cerevisiae biomass.

Decrease in pH to pH 6.1 resulted in 89% of chromium removal and the percentage of removed chromium decreased with decreasing pH so that at pH 2, there was only 61% of chromium removal. Increasing pH to pH 8.2 resulted in decrease of chromium removal only by 67%.

Table 2 shows Cr(VI) removal by dead S. cerevisiae biomass at several pH. Initial S. cerevisiae concentration was 1.5 g/L, glucose concentration was 50 mM, autoclaved for 35 min at 121° C., Cr(VI) concentration was 2 mg/L in MW-004 ground water for 24 hours exposure. The pH was adjusted with 2 N HCl, and the ambient test temperature was 20° C.

TABLE 2

| Initial pH | Final pH | Initial [Cr(VI)] (mg/L) | Final [Cr(VI)] (mg/L) | Cr(VI) removal (%) |
|---|---|---|---|---|
| 2.1 | 2.0 | 2.11 | 0.60 | 70 |
| 4.0 | 4.1 | 1.91 | 1.35 | 32 |
| 6.0 | 5.9 | 1.96 | 1.61 | 20 |
| 8.0 | 7.8 | 1.96 | 1.97 | 0.5 |

The dead cells were able to remove most of the chromium (70%) at acidic pH 2.1. The more alkaline the water, less chromium was removed. At pH 8.0 only 0.5% of chromium was removed.

The ability of live cells and dead cells cultures to remove chromate from water have been shown to differ over a pH range from 2 through 8. Under more acidic conditions, the Cr(VI) removal by live S. cerevisiae became less efficient while at the natural pH (8.2) of MW-004 ground water, 67% of the Cr(VI) was removed. At pH 6.5–7, 100% removal was achieved. In contrast, dead S. cerevisiae in ground water with pH of 8.0 removed only 0.5% of the Cr(VI) but at a pH value of 2.1, 70% of the Cr(VI) was removed from the filtrate (Table 2). In the dead cells controls, there was an inverse relationship of pH and Cr(VI) removal between pH 2 and 8. The highest removal (70%) occurred at pH 2.

Processes that may remove chromate from solution include absorption of Cr(III) by biomass, abiotic reduction of Cr(VI) at low pH, or enzymatic reduction of Cr(VI) by S. cerevisiae. S. cerevisiae grow actively at pH values lower than those optimal for most bacteria. Media with pH values of 2.0 to 8.0 did not significantly change the biomass of live cells cultures over the 24 hours test period.

B. Effect of Temperature on Chromate Removal by S. cerevisiae

Similarly to pH, temperature also plays the role in removal of chromate from the water using S. cerevisiae.

Figure 3:
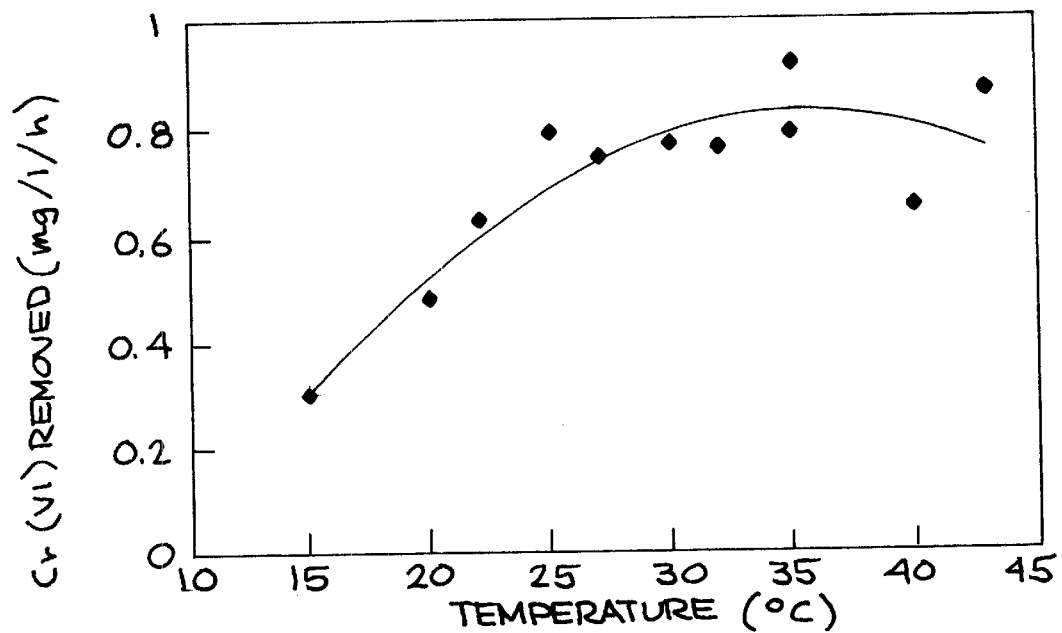
FIG. 3 is a graph showing an effect of ambient temperature on the bioaccumulation of hexavalent chromium by yeast *S. cerevisiae* after a 2 hour exposure.

The effect of temperature on Cr(VI) removal rates in the presence of S. cerevisiae is shown in FIG. 3.

FIG. 3 shows an effect of ambient temperature on the bioaccumulation of Cr(VI) by S. cerevisiae after a 2 hour exposure. Experimental conditions for studies seen in FIG. 3 were: Cr(VI) concentration was 10 mg/L; cell concentration was 8 g/L (cell dry mass per volume); initial pH was 8. The removal of chromium was measured in ground water. Second-order polynomial curve fit Y was $0.73 + 0.09 x + -0.001248 x^2$; R was 0.90.

The optimum Cr(VI) removal rate occurred with incubation temperatures between 25° to 35° C. With a starting concentration of 10 mg/L Cr(VI) and 8 g/L cell dry mass per volume, the shake flasks that were maintained at 15° C. resulted in a Cr(VI) reduction rate of 0.037 mg $hr^{-1}$ (g/dry wt. biomass)$^{-1}$ compared to 0.094 mg $hr^{-1}$ (g/dry wt. biomass) from test flasks maintained at 25° C. The maximum rate of 0.107 mg $hr^{-1}$ was obtained from the test flasks held at 35° C.

For the most efficient process conditions, it was important to determine the temperature at which the maximum removal of the metal happens. As seen in FIG. 3, maximum removal of hexavalent chromium occurred between 25° and 35° C.

C. S. cerevisiae Sensitivity to Cr(VI) Concentrations

To determine S. cerevisiae tolerance for chromate, studies were performed to determine a metabolic activity of S. cerevisiae measured by decrease in carbon dioxide production in correlation to a chromate concentration.

Effect of hexavalent chromium concentration on the carbon dioxide production and hexavalent chromium removal rate by S. cerevisiae is shown in Table 3.

TABLE 3

| Cr(VI) (mg/l) | $CO_2$ produced (mL/h) (SD) | Biomass concentration (mg/L) (SD) | [Cr(VI)] removed (mg/h/g) biomass | % Removed (SD) |
|---|---|---|---|---|
| 0 | 4.8 (0.3) | 7.82 (0.2) | 0.00 (0) | 0.00 (0) |
| 5 | 5.1 (0.5) | 8.15 (0.2) | 0.19 (0.0) | 94.48 (3.4) |
| 50 | 4.9 (0.3) | 8.25 (0.3) | 0.92 (0.1) | 52.26 (11.9) |
| 250[1] | 3.7 (0.3) | N/A | N/A | N/A |
| 500 | 2.4 (0.4) | 8.27 (0.3) | 2.56 (1.8) | 12.37 (8.2) |

TABLE 3-continued

| Cr(VI) (mg/l) | $CO_2$ produced (mL/h) (SD) | Biomass concentration (mg/L) (SD) | [Cr(VI)] removed (mg/h/g) biomass | % Removed (SD) |
|---|---|---|---|---|
| 500[1] | 2.6 (0.7) | N/A | N/A | N/A |
| 1000[1] | 2.1 (0.3) | N/A | N/A | N/A |

[1]200 mM glucose provided to cultures as a nutrient.
N/A analysis not available.
SD standard deviation.

Table 3 illustrates the effect of Cr(VI) concentration on the carbon dioxide gas production and Cr(VI) removal rate by *S. cerevisiae* where the cell concentration was 20 g/L (cell dry wt biomass/L). The incubation time was 16 hours. Unless otherwise specified, the cells were supplemented with 100 mM glucose as a carbon source.

Results seen in Table 3 indicate that *S. cerevisiae* is very chromate tolerant. Unacclimated yeast cells metabolic activity did not decline, as measured by production of $CO_2(g)$ of cell mass, until concentrations of chromate exceeded 50 mg/L. *S. cerevisiae* cells produce less $CO_2(g)$ with chromate concentration of 250 mg/L; from an initial level of 4.8 down to 3.7 mg/L.

D. Effect of Glucose Concentration on the Removal of Cr(VI) by *S. cerevisiae*

Effect and presence of carbon source providing nutrient on the removal of the chromate was also determined. Glucose in concentrations of 50 mM, 100 mM and 500 mM were added to a yeast culture and its effect on removal of chromate by *S. cerevisiae* was observed. Results are seen in Table 4.

TABLE 4

| Glucose (mM) | Biomass (g/L) | Time (h) | Cr(VI) mg removed/h | Removal of Cr(VI) mg $h^{-1}$ (g dry wt biomass)$^{-1}$ |
|---|---|---|---|---|
| 50 | 8.1 | 0.00 | — | — |
|  | 8.3 | 0.03 | 456 | 54.94 |
|  | 8.3 | 0.50 | 5.20 | 0.63 |
|  | 8.3 | 1.00 | 22.9 | 2.76 |
|  | 8.4 | 2.00 | 12.0 | 1.43 |
|  | 8.5 | 3.00 | 8.27 | 0.97 |
|  | 8.7 | 5.67 | 5.21 | 0.60 |
| 100 | 8.1 | 0.00 | — | — |
|  | 8.1 | 0.03 | 444 | 54.81 |
|  | 8.1 | 0.50 | 59.6 | 7.36 |
|  | 8.2 | 1.00 | 33.0 | 4.02 |
|  | 8.2 | 2.00 | 17.4 | 2.12 |
|  | 8.2 | 3.00 | 15.1 | 1.84 |
|  | 8.4 | 5.67 | 9.4 | 1.12 |
| 500 | 8.1 | 0.00 | — | — |
|  | 8.6 | 0.03 | 552 | 64.19 |
|  | 8.7 | 0.50 | 43.2 | 4.97 |
|  | 8.8 | 1.00 | 21.2 | 2.41 |
|  | 9.1 | 2.00 | 15.1 | 1.65 |
|  | 9.4 | 3.00 | 13.5 | 1.44 |
|  | 10.1 | 5.67 | 8.4 | 0.83 |

Table 4 illustrates Cr(VI) removal rates obtained addition of with 50, 100, and 500 mM glucose in shake flasks. Experimental conditions were: temperature was 30° C., initial Cr(VI) concentration was 129 mg/L, 8 g/L dry wt of freshly hydrated *S. cerevisiae* inoculum was used, and initial pH was 8.1 in ground water in culture vessels. Removal of Cr(VI) mg/h/g dry wt biomass was calculated by dividing Cr(VI) mg removed from the supernatant by the g dry wt biomass. The results are the average of replicate samples.

A glucose concentration of 100 mM in yeast cultures resulted in the best Cr(VI) removal rate 1.12 mg/hour from samples taken during 6 hours of cell contact time (Table 4). In this study, Cr(VI) removal followed two-step kinetics. In the first phase, the live yeast cells removed approximately 55 mg Cr(VI)h$^{-1}$ (g dry wt biomass)$^{-1}$ in the first two minutes (Table 4). After the initial step uptake, the subsequent second phase of Cr(VI) removal required glucose and occurred at a much slower rate. The initial large accumulation of chromate (i.e., 54.94 mg, 54.81 mg and 64.19 mg for each studied group seen in Table 4 was due to biosorption of Cr(VI) cations to the biomass, possibly by the cell wall. The second, slower phase is due to metal internalization and is enzyme dependent.

E. Rate of Chromate Removal by *S. cerevisiae*

Figure 4:
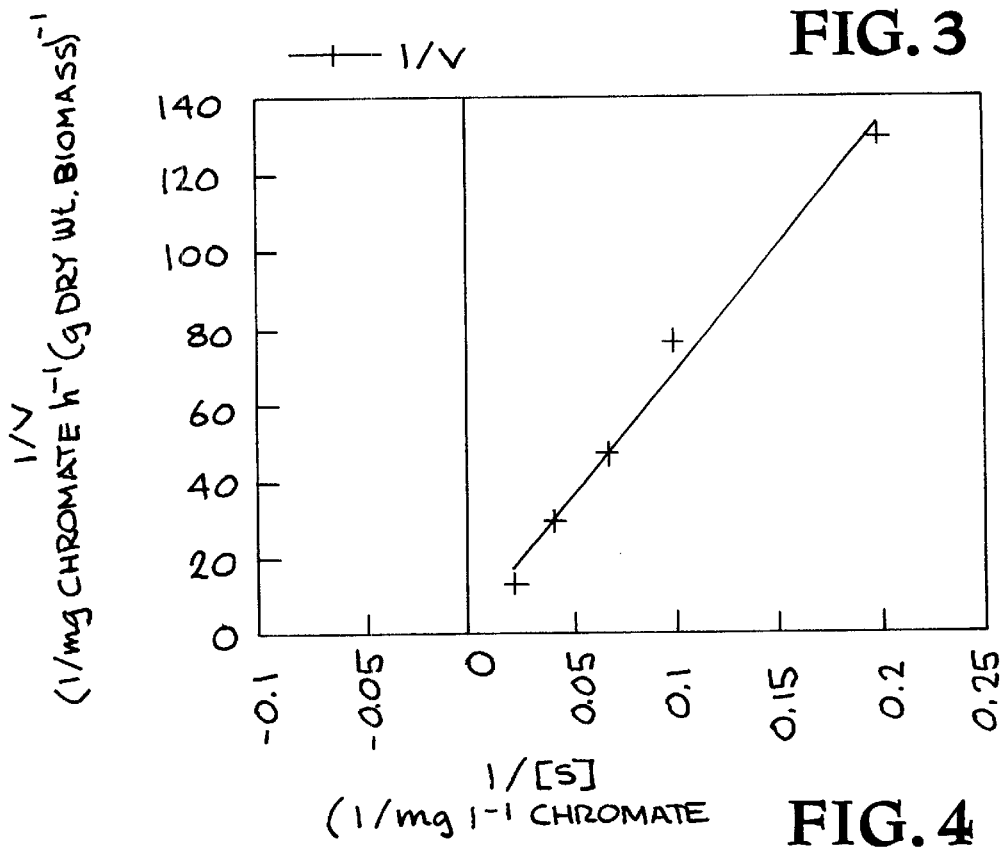
FIG. 4 is a double reciprocal plot of hexavalent chromium reduction by *S. cerevisiae*.

Rate of chromate removal from the ground water MW-004 using the current method was measured. Results are seen in FIG. 4 which show a double reciprocal plot of rates of chromate removal attained by *S. cerevisiae* during 0-order growth. The double reciprocal plot is the rate of chromate reduction by yeast cells as a function of initial chromate concentration in the flask.

*S. cerevisiae* removed hexavalent chromium in the form of chromate at concentrations ranging from 0.1 to 50 mg/L. The experiments were performed under completely mixed, anoxic conditions, using glucose (100 mM) as a carbon source. The rate of chromate reduction attained during complete chromate removal was 0.227 mg Cr(VI)h$^{-1}$ (g dry wt. biomass)$^{-1}$ and $K_m$ was 145 mg/L$^{-1}$ chromate. The high $K_m$ value indicates that there is not a strong affinity for Cr(VI). These results agree with a rate of Cr(VI) reduction of 0.2 mg Cr(VI)h$^{-1}$ (g dry wt. biomass)$^{-1}$ obtained by using an electron spin resonance (ESR) technique, as described by Mehlhorn, et al., DOE publication in UCRL-JC-119558 (1995).

*S. cerevisiae* Cr(VI) removal rate was compared to that of *P. fluorescens*. The removal of chromate with *P. fluorecens*, tested under the same test conditions as *S. cerevisiae*, using the same ground water and environmental temperatures, was significantly slower than that obtained with *S. cerevisiae* where the initial rate of removal was 0.47 μg h$^{-1}$ (g dry wt biomass)$^{-1}$ by *P. fluorescens* versus 0.227 mg h$^{-1}$ (g dry wt biomass)$^{-1}$ achieved with *S. cerevisiae*.

F. Bioreactor studies

Removal of hexavalent chromium was performed in bioreactor experiments where the use of *S. cerevisiae* as an agent for accumulating or reducing Cr(VI) to its less toxic form was investigated for potential large scale ground water decontamination.

In these experiments both the effects of aerobic versus anaerobic reactor conditions on Cr(VI) removal and material balance of a batch reactor were investigated.

1. Effect of Aerobic and Anaerobic Reactor Conditions

Figure 5:
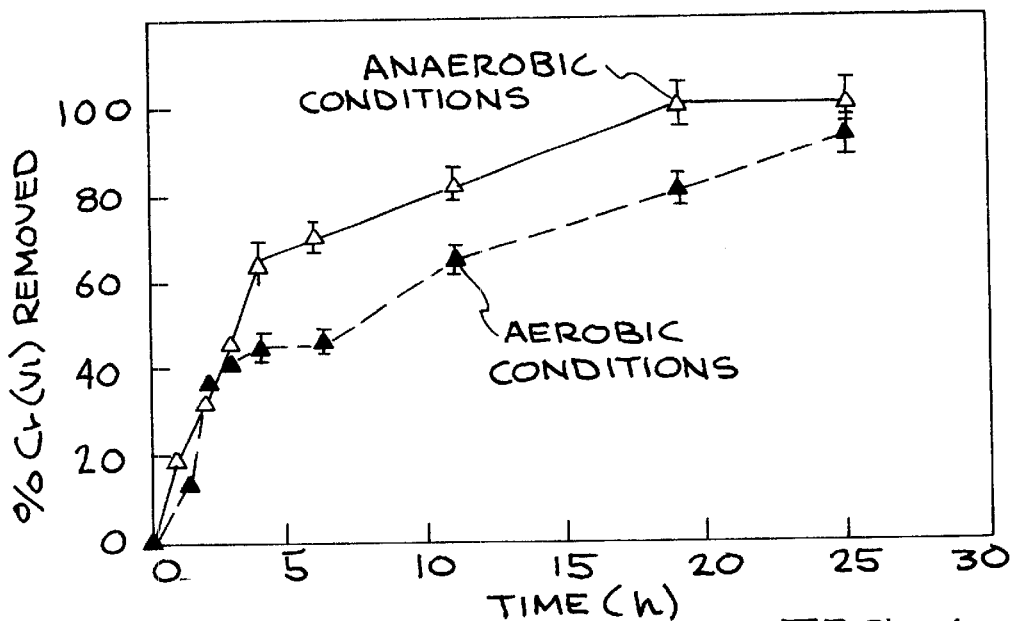
FIG. 5 is a graph illustrating the *S. cerevisiae* ability to accumulate hexavalent chromium under aerobic and anaerobic conditions.

A series of reactor tests were conducted to measure the effect of air on the *S. cerevisiae* cells ability to remove Cr(VI) from a water solution. For this purpose, both aerobic and anaerobic conditions were simulated. In one test, air was introduced to the reactor at 1.7l/min, (aerobic conditions) the maximum allowed by the reactor. The rate of Cr(VI) reduction/accumulation over time in the aerated test was compared to a reactor test in which no additional oxygen was provided (anaerobic conditions). Both tests were conducted at the ground water temperature (19° C.). As seen in FIG. 5, the reduction of Cr(VI) in the oxygen-limited reactor, that is under anaerobic conditions, was approximately 10%–25% greater. In bioreactor studies, the chromium removal rate was slightly faster under anaerobic rather than under aerobic conditions.

An overall mass balance was obtained by analyzing the feed and outflow liquid, gas, and solids in a stir-tank reactor.

A control test, conducted in the absence of microorganisms, resulted in 100% recovery of the Cr(VI) in the reactor liquid effluent. Inclusion of *S. cerevisiae* in these experiments resulted in reduction of Cr(VI) to less toxic chromium cations such as trivalent chromium (CrIII).

2. Materials Balance of a Batch Reactor

In order to detect whether the process is selective for removal of a specific metal, materials balance in the bioreactor was studied.

Although many chemical reactions took place in the reactor, only the elemental ratios of chromium and carbon compounds in the effluent changed greatly. These byproducts depend on the level of chromium reduced, the metal concentration in the feed, and on the reactor pH, provided that optimal microbial and experimental conditions exist within the reactor. Microorganisms consume organic compounds, such as sugar, for growth and energy. A byproduct of this metabolism is the production of electrons. These electrons are used in the reduction of chromate Cr(VI) to chromium hydroxide $Cr(OH)_3$. The solubility of $Cr(OH)_3$ is $6.7 \times 10^{-31}$ mg/L and hydroxide thus precipitates out of solution.

In the materials balance study both hexavalent and total chromium were examined. In the experimental setup, the chromium was investigated in two oxidative states: as hexavalent or trivalent chromium. Hexavalent chromium was the species which was placed into the culture. Hexavalent, more toxic chromium form colors the water yellow in the parts per million range. Trivalent, less toxic chromium form is the thermodynamically preferred state which precipitates.

Table 5 shows materials balance distribution over a bioreactor as determined by the chemical control, dead cell control and live cell tests. In each test, materials balance of aqueous influent and effluent is seen and the experimental conditions are described.

TABLE 5

| AQUEOUS ANALYTE | INFLUENT | EFFLUENT | GASEOUS ANALYTE | EFFLUENT | SOLID ANALYTE | EFFLUENT |
|---|---|---|---|---|---|---|
| Chemical Control | | | | | | |
| Hexavalent chromium | 2.08 | 2.10 mg/L | Ethanol | 1.5 ppmv | Biomass $(CH_2O)_6$ | 0.00 mg/mL |
| Total chromium | 2.1 | 2.3 mg/L | Carbon dioxide | 0.05% | Total chromium | 0.00 mg/L |
| Bicarbonate | 270 | 260 mg/L | | | | |
| Dissolved oxygen | 99 | 108% | | | | |
| $E_h$ | 310 | 307 mV | | | | |
| Hydroxide ion | <0.1 | <0.1 mg/L | | | | |
| Iron | <0.01 | <0.01 mg/L | | | | |
| Lactate | <0.2 | <0.2 mM/L | | | | |
| Nitrate | 5.1 | 5.1 mg/L | | | | |
| pH | 8.2 | 8.29 units | | | | |
| Sulfate | 53 | 53 mg/L | | | | |
| Total dissolved solids | 5000 | 4900 mg/L | | | | |
| Dead Cell Control | | | | | | |
| Hexavalent chromium | 2.1 | 0.58 mg/L | Ethanol | 14 ppmv | Biomass $(CH_2O)_6$ | 1.13 mg/mL |
| Total chromium | 2.1 | 0.94 mg/L | Carbon dioxide | 1.7% | Total chromium | 0.68 mg/l |
| Bicarbonate | 150 | 73 mg/L | | | | |
| Dissolved oxygen | 100 | 0% | | | | |
| $E_h$ | 345 | 336 mV | | | | |
| Hydroxide ion | <0.1 | <0.1 mg/L | | | | |
| Iron | <0.01 | <0.01 mg/L | | | | |
| Lactate | <0.2 | 4.5 mM/L | | | | |
| Nitrate | 5.5 | 5.4 mg/L | | | | |
| pH | 8.3 | 6.0 units | | | | |
| Sulfate | 61 | 62 mg/L | | | | |
| Total dissolved solids | 5200 | 5000 mg/L | | | | |
| Live Cell Test | | | | | | |
| Hexavalent chromium | 1.87 | 0.00 mg/L | Ethanol | 300 ppmv | Biomass $(CH_2O)_6$ | 4.65 mg/mL |
| Total chromium | 2.03 | 0.61 mg/L | Carbon dioxide | 27% | Total chromium | 1.28 mg/L |
| Bicarbonate | 150 | 3400 mg/L | | | | |
| Dissolved oxygen | 99 | 0% | | | | |
| $E_h$ | 321 | 90 mV | | | | |
| Hydroxide ion | <0.1 | <0.1 mg/L | | | | |
| Iron | <0.01 | <0.01 mg/L | | | | |
| Lactate | <0.2 | <0.2 mM/L | | | | |
| Nitrate | 5.2 | 5.1 mg/L | | | | |
| pH | 8.1 | 6.5 units | | | | |
| Sulfate | 44.9 | 53 mg/L | | | | |
| Total dissolved solids | 5700 | 7100 mg/L | | | | |

Table 5 shows materials balance of aqueous influent and effluent, gaseous effluent and solid effluent in a 24 hour bioreactor study. In each reactor study groundwater was used, Cr(VI) was added (2–0 mg/L) and glucose (50 mM/L) was added as a food source for the yeast. The reactor was maintained at 24° C. and about 1 ATM. The dead cell control and the live cell test were pH adjusted with 4N NaOH. No oxygen was provided during these tests.

In chemical control (CC) test, culture hexavalent chromium concentration did not change over the 24 hours test period. Total chromium concentrations of the CC culture were from 2.08 to 2.1 mg/L throughout the test. All added hexavalent chromium in the bioreactor remained in the hexavalent state. The total chromium in the effluent was 0.00.

Where before the addition of the dead cells (DC) biomass the hexavalent chromium concentration was 2.1 mg/L, with the addition of the dead cells (DC) culture, the Cr(VI) concentration, as seen in DC control test, decreased to 0.58 mg/L, that is by about 70%, after the 24 hours incubation. With the introduction of the dead-cell biomass, the total chromium concentration decreased from 2.1 to 0.94 mg/L, that is about 55%, after 24 hours incubation. The total chromium removed in the DC culture (about 1.16 mg/L) was most likely due to biosorption on the dead cell biomass.

Hexavalent chromium in the live cells (LC) culture was completely removed within 24 hours. Only chromium species remaining in the effluent were non-hexavalent species. These species represented the remainder of about 30% (0.61 mg/l) of the initial total chromium (2.03 mg/l). There was no hexavalent chromium found after 24 hours of incubation.

The results in Table 5 clearly confirm that the living S. cerevisiae added to the bioreactor are able to completely bioreduce all hexavalent chromium as well as reduce substantially by about 70% the amount of all chromium species. The dead S. cerevisiae added to the bioreactor were able to remove 70% of the hexavalent chromium and reduce the levels of total chromium by about 55%. The chemical control without presence of either living or dead S. cerevisiae did not have any effect on hexavalent or total chromium concentrations.

The most preferred mode of the invention is therefore use of living S. cerevisiae cell biomass added to the metal contaminated water.

The pH in the CC cultures was relatively constant, ranging from 8.2 to 8.3 without any need for adjustment. The reactor solution in the presence of LC culture has an initial pH of 8.1 but then declined to 2 or 3 due to the metabolism of glucose by the yeast, which produces acids such as lactic acid. However, for the LC culture the reactor pH was adjusted to pH 6.5 with 4 M sodium hydroxide. The decision to make such an adjustment was based on the minimum pH values permitted for ground water surface discharge. The pH value of 6.5 was also chosen because yeast cells grow best at neutral pH values as seen in Tables 1 and 2.

The redox potential ($E_h$) is determined by electron activity. Redox potential increases with the addition of dichromate, a strong oxidizer, to ground water. $E_h$ increases by approximately +150 mV with increasing Cr(VI) concentration up to 1,000 mg/L. Local untreated ground water had a pH of 8.2 and an $E_h$ of +343 mV at 20° C., a substantial oxidizing potential.

Figure 6:
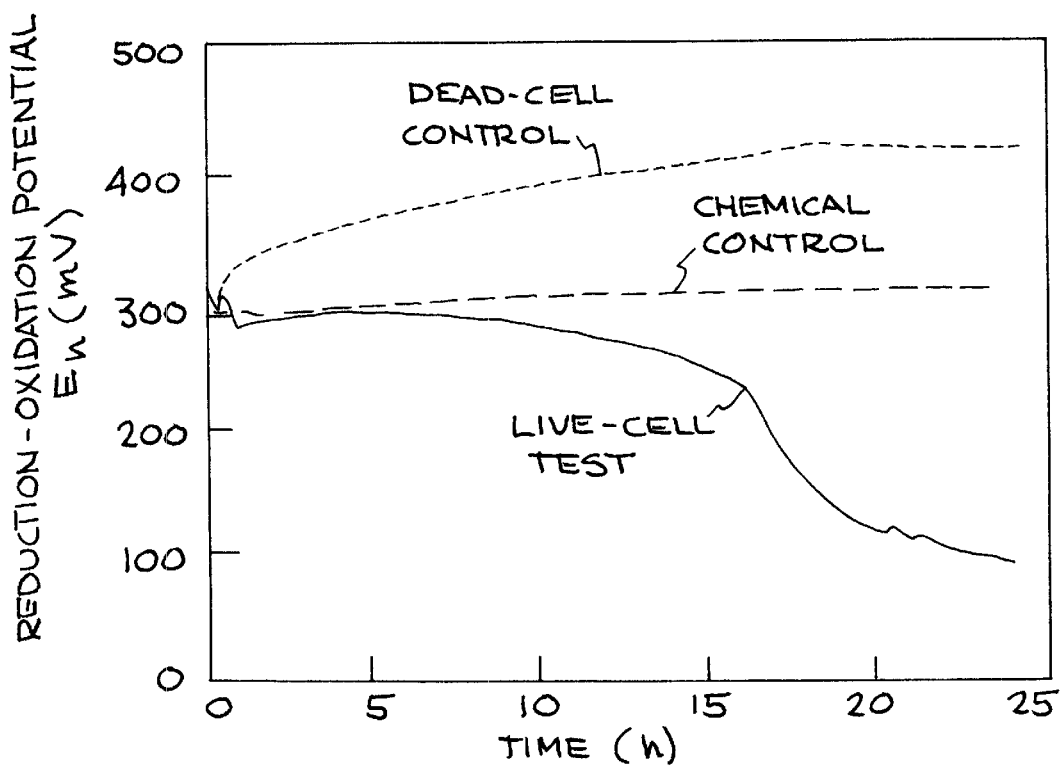
FIG. 6 is a graph showing reduction-oxidation potential in chemical control tests, in dead-cell control tests, and in live-cell tests.

Data from LC inoculated reaction vessels suggested that reducing potential increased after approximately 5 hours of acclimatization (FIG. 6). FIG. 6 is a graph showing local ground water which had a pH of 8.2 and an $E_h$ of +343 at 20° C. Redox measurements were electronically recorded in the reactor at one-minute intervals during three 24 hours tests. The tests included a chemical control, a dead cell, and a live S. cerevisiae test series. The redox potential readings are reported relative to the normal hydrogen electrode corresponding to the filling solution used and the temperature of the solution measured. Reducing conditions developed only in the presence of viable cells. The chemical control redox potential maintained $E_h$ at a relatively stable +286 to +307 mV through the 24 hours test period. The heat-killed dead cells increased $E_h$ from about +315 to about +396 mV in 5 hours. The DC culture $E_h$ stabilized at value greater than the CC culture. The dead-cell biomass seemed to become an electron donor thereby increasing the $E_h$. The majority of Cr(VI) removal from the DC solution was likely due to biosorption and not reduction. However, 30% of the total chromium remaining was in an oxidated state other than Cr(VI). In the LC culture $E_h$ began at +321 mV and decreased to +90 mV during the 24 hours test period. The pH was not allowed to decrease below 6.5 and most likely the addition of NaOH decreased the ability of the LC culture to reduce Cr(VI).

The initial ground water bicarbonate ion concentration was 150 mg/L. In the DC, the bicarbonate concentrations decreased to 73 mg/L by 24 hours and increased to 3400 mg/L in the LC culture. Equilibrium between $HCO_3^-$ and $CO_3^{2-}$ is influenced by cellular $CO_2$ produced during the metabolism of glucose.

Specific conductance values changed significantly among the various groups (Table 6).

TABLE 6

| Analyte | Chemical Controls | | Dead Cell Culture | | Live Cell Culture | |
|---|---|---|---|---|---|---|
| | Time 0 | Time 24 | Time 0 | Time 24 | Time 0 | Time 24 |
| Calcium | 52 | 52 | 38 | 37 | 35 | 34 |
| Magnesium | 20 | 20 | 23 | 22 | 20 | 15 |
| Potassium | 3.0 | 3.2 | 32 | 30 | 10 | 7.0 |
| Chloride | 120 | 120 | 200 | 190 | 130 | 120 |
| Fluoride | 0.45 | 0.46 | 0.43 | 0.40 | 0.43 | 0.42 |
| Specific Conductance | 850* | 880* | 980* | 960* | 840* | 5700* |
| Arsenic | ND | ND | ND | ND | ND | ND |
| Barium | 0.975 | 0.073 | 0.069 | 0.070 | 0.067 | 0.057 |
| Cadmium | ND | ND | ND | ND | ND | ND |
| Lead | ND | ND | ND | ND | ND | 0.002 |
| Selenium | ND | ND | ND | ND | ND | ND |
| Silver | ND | ND | ND | ND | ND | ND |

*Units are $\mu$m/hour/cm at 25° C.
ND Not detected at or above the limit of detection (LOD).

Table 6 shows aqueous phase minerals and metals levels data for the chemical control, dead cell culture, and live cell culture at 0 and 24 hours. The investigated water was a MW-004 ground water spiked with 2 mg/L (ppm) hexavalent chromium. All units are reported in mg/L unless otherwise noted.

Specific conductance, or the ability of a solution to conduct a current, depends on the presence of ions, their total concentration, mobility, valence, and relative concentration. The CC culture specific conductance value was about 850 $\mu$m/hour/cm (25° C.), typical for chromate containing ground water. The DC culture specific conductances were 980 and 960 $\mu$m/hour/cm at 0 and 24 hours, respectively. This increased conductivity against chemical control culture may be due to lysed cells. The LC culture specific conductance values were 840 and 5700 $\mu$m/hour/cm at 0 and 24 hours, respectively. The increase in the specific conductance in the LC culture at 24 hours indicates an increase in electrolyte production.

Calcium concentrations in the CC culture were similar to those found in the ground water, whereas the values obtained for the LC and DC cultures were 30% lower than ground water values (Table 6). Magnesium concentrations in the CC, DC, and LC cultures were between 15 and 20 mg/L similar to those found in the ground water. Barium concentrations in the CC and DC cultures were unchanged during the test. However, the barium concentration in the LC culture was decreased 15% during the test. Apparently, there is some affinity between the cells and barium. The potassium ion concentration changed significantly among the various groups.

The aqueous phases from all cultures were analyzed for standard drinking water metals such as arsenic, barium, cadmium, hexavalent chromium, total chromium, lead, selenium, and silver (Table 6). Arsenic, cadmium, selenium, and silver were not detected at or above their levels of detection (LODs) in any test culture. In addition, the aqueous phases from all cultures also were analyzed for the bromide, chloride, fluoride, nitrate, nitrite, phosphate, and sulfate anions. Bromide, nitrite, and phosphate were not detected at or above their LODs in any culture.

Results obtained in this study show that a solution to Cr(VI) or other metal contamination problem in ground water is a process according to the invention selectively removing the chromium or other metals from water with common baker's yeast, S. cerevisiae.

Summarizing studies performed to support the process and system of the invention, it has been conclusively found that chromium can be removed from ground water by the unicellular yeast, Saccharomyces cerevisiae. Contaminated ground water maintains chromium as a hexavalent species $CrO_4^{2-}$ because of bicarbonate buffering, and pH (8.2) and $E_h$ conditions (+343 mV). Commercially available non-pathogenic S. cerevisiae were used to remove hexavalent Cr(VI) from ground water. Optimal parameters, such as temperature, pH, cell biomass concentration for Cr(VI) removal, were determined. S. cerevisiae removed Cr(VI) under aerobic or anaerobic conditions with a greater rate or removal occurring under anaerobic conditions. The kinetic studies revealed a reaction rate ($V_{max}$) of 0.227 mg Cr(VI) $hr^{-1}$ (g dry wt. biomass)$^{-1}$ and a Michael is constant ($K_m$) of 145 mg/L$^{-1}$ in natural ground water using mature S. cerevisiae. A rapid initial removal of Cr(VI) of 55 to 67 mg hr$^{-1}$ was found with freshly hydrated living cells (g dry wt. biomass)$^{-1}$ in the first 2 minutes, followed by a much slower uptake (0.6 to 1.1 mg Cr(VI) hr$^{-1}$ (g dry wt. biomass$^{-1}$)) that diminished with time. A materials-balance for a batch reactor over 24 hours resulted in an overall shift in redox from +321 to +90 mV.

Figure 7:
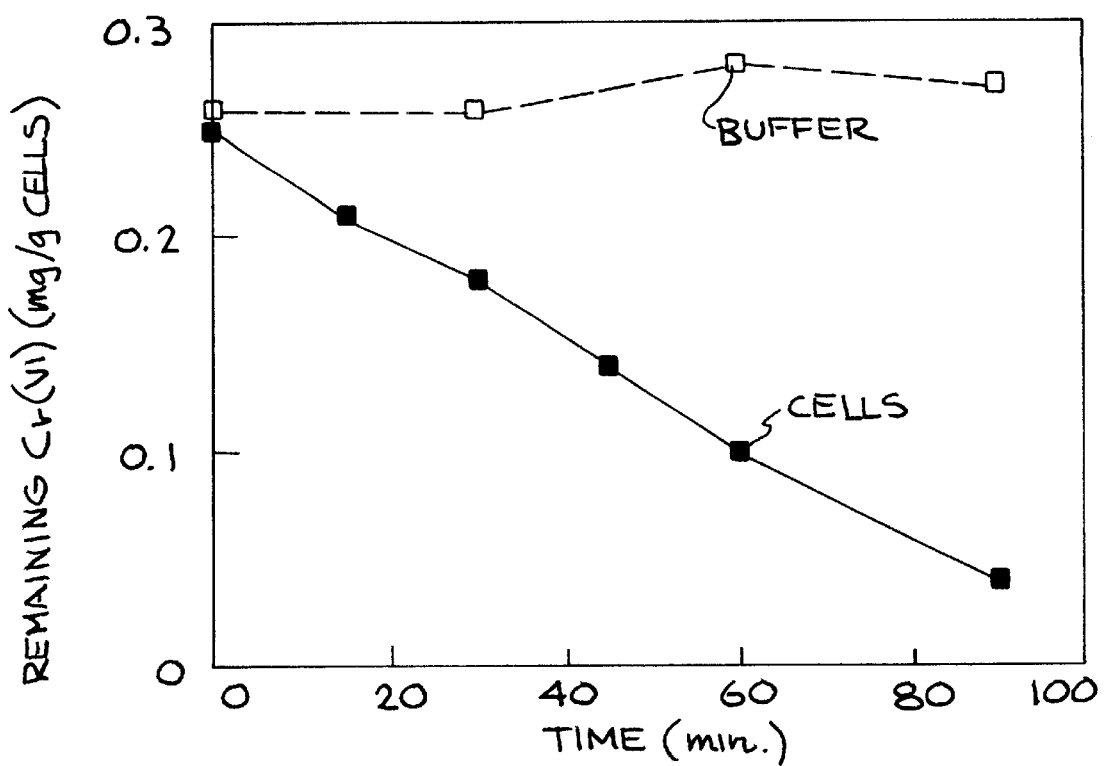
FIG. 7 is a graph showing removal of hexavalent chromium from aqueous solution by *S. cerevisiae*.

FIG. 7 illustrates removal of hexavalent chromium primarily by reduction to trivalent chromium, from aqueous solution by S. cerevisiae. Cells (■) (1% dry weight) were suspended in 40 mM chelex-treated (Biorad, Hercules, Calif.) sodium phosphate, pH 7.4, containing 25 mg/L chromium and 2% glucose. Residual hexavalent chromate in supernatant fractions of centrifuged cells (■) was analyzed by electron spin resonance technique described in UCRL-JC-119558. As seen in FIG. 7, cells suspended in the buffer containing glucose reduced amount of hexavalent chromium substantially within 100 minutes. Glucose-containing buffer did not reduce hexavalent chromium (□).

Supernatant of centrifuged cells that had been stirred in air for about one hour exhibited significant rates of Cr(VI) reduction as seen in Table 7.

TABLE 7

| Chemical controls | | Extract Cells grown aerobically | | Extract Cells grown anaerobically | |
|---|---|---|---|---|---|
| Time (d) | Remaining Cr(VI) mg/L (SD) | Time (d) | Remaining Cr(VI) mg/L (SD) | Time (d) | Remaining Cr(VI) mg/L (SD) |
| 0 | 2.01 (0.007) | 0 | 2.04 (0.021) | 0 | 2.05 (0.014) |
| 3 | 2.00 (0.028) | | | | |
| 4 | 1.92 (0.007) | 4 | 1.54 (0.005) | 4 | 0.00 (0.00) |

SD standard deviation

Table 7 shows cell-free extracts of S. cerevisiae culture medium in ground water with 2 mg/L hexavalent chromium. Extracts were obtained from cells grown aerobically or anaerobically. Ground water from MW-004 was used for the chemical control samples and the culture media. MW-004 ground water contains 32 $\mu$g/L Cr(VI), and it is typical of the slightly alkaline and oxidizing conditions. One culture was grown aerobically and one was grown anaerobically. Test temperature was 23.7° C., initial pH was 8.44, culture age was 48 hours. Cr(VI) was analyzed spectrophotometrically using EPA methods. As seen from Table 7, chemical controls had no effect on Cr(VI) levels. Cell extracts grown aerobically were able to decrease a level of Cr(VI) by about 25%. The cells extract, grown anaerobically completely removed Cr(VI) and shown thus 100% efficiency in removal of hexavalent chromium from the ground water. Cell-free extracts also reduced Cr(VI) to Cr(III).

The mechanism of this cell-free chromate reduction has not been determined, but may be related to the relatively potent Cr(VI) reduction activity of cell lysates relative to that observed in intact cells, or extracellular reductases as seen in Table 7. Consistent with this interpretation is an observation that repeated washing of cells with glucose-containing buffer significantly decreased the rate of Cr(VI) reduction observed in freshly prepared cell supernatant fractions.

UTILITY

This invention is generally useful for complete removal or substantial reduction of the metals from contaminated ground water or leached soil.

The invention utilizes bioreduction and bioaccumulation process using a nonpathogenic microorganism S. cerevisiae. Bioreduction and bioaccumulation is an alternative technique to reduce the amount of secondary wastes.

Ground water pumped from contaminated aquifers to remove hazardous organic constituents such as metals must meet discharge requirements for toxic or hazardous metals before reinjection. Currently ion exchange resins are used to remove Cr(VI) from the ground water. This technology results in production of secondary wastes such as spent resins and acidic rinse water. The biological removal of Cr(VI) from the ground water according to this invention is a means to protect the environment in a manner commensurate with public health, economic, social, and political concerns.

Bioreduction of Cr(VI) to Cr(III) with S. cerevisiae or with S. cerevisiae products enables the surface discharge of treated ground water without chemical or resin treatments. Successful development of this technology is useful in commercial facilities, such as waste water and sewage treatment stations, tanneries, and electroplating facilities found in automotive equipment manufactures, stainless steel manufactures, and nuclear and high-temperature research operations.

The invention illustrated its utility on removal of hexavalent chromium from ground water using *S. cerevisiae* cells. Other metals such as molybdenum, cobalt, zinc, nickel, calcium, strontium, mercury, and copper will combine with these cells and can therefore be removed or reduced to allowable levels using this technology.

EXAMPLE 1

Treatment of *S. cerevisiae* Cells

This example describes methods used for culturing and testing yeast cells *S. cerevisiae* utilized in this technology.

The organism used in this study was commercially produced, dehydrated *S. cerevisiae* obtained from Fleischmann's, Oakland, Calif.

In shake flask experiments, *S. cerevisiae* was cultured in Sabouraud broth (SAB) containing dextrose, 20.0 g/L; peptone, 10.0 g/L; and 1 L of ultra pure water adjusted to pH 7 with 2 M HCl and autoclaved 25 min at 121° C. *S. cerevisiae* cultures were regenerated by weighing pelleted cells into 2% SAB in shaker flasks and incubated overnight at 30° C. on a 220 rpm rotary shaker. Cells were harvested the next day by centrifuging in 200 mL Kimax centrifuge bottles for 10 min at 2500 rpm. The resulting cell pellet was then suspended in filtered ground water and centrifuged again for 10 min at 2500 rpm. The water was decanted off the pellet and cells were resuspended in sterile, filtered ground water. Final cell density was about 8 g dry wt biomass/L.

A variety of culture conditions was used for experiments with several culturing periods that ranged from 30 min to 3 days. Experiments were defined individually. Typically, 1 mL samples were withdrawn from the stirred suspension with a micropipette and treated with chromate or other reagents in a 1.5 mL Eppendorf tube.

In the reactor studies, the dehydrated yeast pellets were weighed and added directly to the test vessels to an initial concentration of about 8 g/L. Dried cell weights were obtained by filtering a known volume of the culture through a tarred, 0.45-$\mu$m membrane filter, rinsing the resulting pellet, and drying it at 80° C. for 24 hours.

The pH was monitored in reactor tests with an Ingold OPM 131 electrode (New Brunswick Sci. Co., Edison, N.J.). For experiments with live cells, the pH was maintained at 6.5 by neutralizing the acid production with 4N NaOH. A strong alkali was chosen to limit dilution.

Cells were killed by autoclaving them at 120° C. at 2 ATM for 35 min, by irradiating them with $Cs^{137}$ for 90 min, or by adding mycostatin to the culture. Because autoclaving was the most reliable method of killing yeast cells, it was used for all subsequent experiments. Triplicating plating on SAB plates was used to verify that dead cells were nonviable.

EXAMPLE 2

Analytical Methods

This example describes analytical methods and procedures used in development of the invention.

Measurements of redox potential were used to determine the oxidizing or reducing capability of the reactor fluid. Quinhydrone (Sigma Chemical Co., St. Louis, Mo.) was used to calibrate the $E_h$ probe (Orion Ionanalyzer combination redox probe). The dissolved oxygen was measured by an oxygen probe (Ingold, polarographic). The redox potential readings were reported relative to the normal hydrogen electrode, corresponding to the filling solution used and the temperature of the solution measured.

Glucose was provided as the carbon and energy source.

The Cr(VI) source was $K_2Cr_2O_7$ (Sigma Chemical Co. St. Louis, Mo.). To distinguish the biotic from abiotic Cr(VI) removal, tests were run with chemical control (CC) series, dead-cell (DC) control series, and the live-cell (LC) test series.

Hexavalent chromium samples were collected in 25-mL aliquots in acid-washed, screw cap, 50-mL test tubes and analyzed spectrophotometrically using U.S. Environmental Protection Agency (EPA) methods (Standard Method, 17th ed. 3500-Cr D. Colorimetric method). This method is based on the reaction of Cr(VI) with diphenylcarbazide in an acidified solution. Measurements were conducted in 5-cm path length cuvette with a Shimadzu spec UV160U at 540 nm absorbency under yellow room lighting for light-sensitive reagents.

Total chromium was analyzed on a Perkin-Elmer 5100 series Atomic Absorption Spectrophotometer (AAS) equipped with a 4-inch single-slot flame head. The AAS was outfitted with a Transverse High Temperature Graphite Furnace and AS-71 autosampler. A Perkin-Elmer chromium lamp was used as the energy source for both flame and furnace analyses. Biomass was collected on 0.45-$\mu$m Millipore filters and digested in a solution of nitric:hydrochloric acid (50:50) for 24 to 48 hours, depending on the digestion process.

EXAMPLE 3

Determination of Parameters Affecting Kinetic Process

This example describes procedures used for determination of parameters which affect kinetics of process.

Effect of pH on Chromate Removal

Ground water pH was adjusted to 7 different pH levels with 2N HCl from pH 8.2 to 2.0 in 250-mL Erlenmeyer flasks. Each flask initially contained 1.5 g dry wt biomass/L, 50 mM glucose, and 2 mg/L CR(VI) and was incubated for 24 hours at 20° C. A duplicate set of flasks was inoculated with 1.5 g dry wt biomass/L of dead yeast and handled in the same manner. The cell suspensions were filtered through 0.45-$\mu$m membrane filters, and replicate aliquots of the supernatant were analyzed for Cr(VI).

Effects of Temperature on Chromate Removal

Flasks containing filtered MW-004 ground water and 25 mM glucose were inoculated with 8 g dry wt/L activated dry yeast. Eight different temperatures were tested, ranging from 15° C. to 40° C. Replica sets of inoculated and uninoculated flasks were placed in incubators and allowed to come to temperature. Then 2 mg/L Cr(VI) was added to each flask. After a 2-hours incubation, a 10-mL aliquot from each flask was filtered through a preweighed 0.45-$\mu$m filter. The pellets were rinsed, dried, and weighed for biomass, and the filtered supernatant were analyzed for Cr(VI).

Toxicity of Hexavalent Chromium to Yeast Cells

The effect of Cr(VI) concentration on yeast metabolism was evaluated by measuring the carbon dioxide gas ($CO_2$) production. Six different concentrations of Cr(VI) were tested, ranging from 0 to 1000 mg/L. The initial cell concentration was 20 g dry wt biomass/L. The incubation time was 16 hours at 20° C. and the cells were provided 100 mM glucose as a carbon source. $CO_2$ gas production was measured in triplicate calibrated water columns.

Effects of Glucose Concentration on Chromate Removal

The effect of 50, 100, 500, and 1000 mM glucose concentration on Cr(VI) removal from ground water (pH 8.1) was evaluated in batch tests. The experiments were started with 8.25 g dry wt/L yeast and continued for 6 hours. The experiment was started with freshly hydrated yeast cells. The Cr(VI) initial concentration was 129 mg/L, and the incubation temperature was 30° C. Cr(VI) removal and biomass in the media was measured periodically over 6 hours time course.

EXAMPLE 4

Kinetic Studies

This example describes conditions used for kinetic studies on the interaction between the yeast cells and chromate.

Kinetic studies on the interaction between Cr(VI) and S. cerevisiae were performed under completely mixed conditions on a rotary shaker (New Brunswick Sci. Co., 120 rpm). Chromate reduction experiments were performed in filtered ground water (pH 8.1) containing Cr(VI) at concentrations ranging from 0.1–50 mg/L. The hexavalent chromium source was $K_2Cr_2O_7$. The inoculum was S. cerevisiae (5 g dry wt biomass/L) and the incubations were performed at room temperature (21° C.) with 25 mM glucose. Samples were taken from the suspension and filtered immediately through 0.22-$\mu$m membrane filters to remove cells. The filtrate collected was analyzed by atomic absorption spectrophotometry for residual Cr(VI) concentrations. CC and DC controls were used.

EXAMPLE 5

Reactor materials balance

This example illustrates conditions used for reactor tests.

An analysis of the feed and outflow liquid, gas and solid streams was conducted for three reactor test sets: live cell culture (LC), chemical control (CC) and dead cell culture (DC). The ground water was amended with 2 mg/L (40 mM) Cr(VI) for each test set. The reactor used in this study was a modified New Brunswick BiofloIII attached to a Neslab chiller and an $E_h$ monitoring system that included a Tectronics AMZ amplifier for increasing the mV signal. Data were collected on a Mac II CX using National Instrument LabView software. The reactor was allowed to come to steady state prior to inoculation. The testing period was 24 hours, and pH, $E_h$, dissolved oxygen, and agitation were measured.

At the end of each experiment, the reactor contents were divided into vapor, aqueous, and solid phases. The vapor phase from the reactor was collected in humidified tedlar bags, and sent with air blanks and standards to a certified laboratory (Air Toxics Inc., Sacramento, Calif.) for vapor analysis. Gas chromatography and mass spectroscopy were used to identify all total ion chromatogram (TIC) peaks. The culture aqueous phase was filtered through a 0.22-$\mu$M cellulose acetate Millipore membrane filter. The filtrate was collected in Erlenmeyer vacuum flasks and sent to a certified laboratory (California Laboratory Services, Rancho Cordova, Calif.) for general minerals, anions, nitrogen (organic and inorganic), drinking water metals, and EPA 624 analysis. The cell wash filtrate was analyzed for chromium at LLNL. The solid phase was the residual cell material remaining on the filter paper after aqueous phase collection. The cell mass was washed with analytical grade water. The cell mass and filter paper were analyzed for total chromium.

EXAMPLE 6

Electron Spin Resonance Assays

This example describes an electron spin resonance assays used for analysis of chromate metabolism in S. cerevisiae conducted by R. J. Mehlhorn, as described in UCRL-JL-119558.

The Cr(VI) assay consisted of analyzing a transient paramagnetic Cr(V)-complex that arises from the univalent reduction of Cr(VI) by thioglycerol and complexing Cr(V) with glycerol and thioglycerol. Two reaction cocktails, RC1 to control pH and facilitate ligand exchange, and RC2 to reduce Cr(VI) and form a persistent Cr(V) complex, were developed empirically to avoid a suppression of the ESR species by rection intermediates and products. RC1 consists of 0.5 M $NaHCO_3$ and 0.1 M sodium phosphate, pH 7.4; whereas RC2 consists of 0.4 M glycerol and 20 mM thioglycerol in 10 mM sodium phosphate, pH 7.4. The assay consisted of treating 25 $\mu$l of an unknown sample with 0.5 $\mu$l of 10 mM sodium ferric-EDTA, 5 $\mu$l of RC1, and 20 $\mu$l of RC2 and placing the mixture into a 100-$\mu$l glass capillary for ESR analysis. The ESR signal arising from the reaction was scanned at 2-min intervals to determine its maximum magnitude. Quantification of chromate was relative to ESR signals arising from defined additions of potassium chromate to the unknown solution. In some experiments, larger ESR signals were obtained by replacing thioglycerol in RC1 with reduced nitroxide TOLH (1,4-dihydroxy-2,2,6,6-tetramethyl piperidine).

What is claimed is:

1. A system for remediation of a metal from metal contaminated ground water using a living S. cerevisiae cell biomass, said system consisting essentially of:
   (a) a bioreactor for contacting the metal contaminated water with the nonpathogenic living S. cerevisiae cell biomass to bring about bioreduction and bioaccumulation of said metal;
   (b) nonpathogenic S. cerevisiae cell biomass comprising living cells; and
   (c) means for separating and removing the metal from a treated water.

2. The system of claim 1 wherein the bioreactor further comprises:
   (a) injection systems for injection of the contaminated water, buffering agents, nutrients and living S. cerevisiae cell biomass;
   (b) stir-tank for stirring added buffering agents, a carbon source, and living S. cerevisiae cell biomass;
   (c) settling tanks for separation of water; and
   (d) storage tanks for reclaimed water.

3. The system of claim 2 comprising further means for thermal maintenance of constant temperature during the remediation.

4. The system of claim 3 wherein the metal is chromium VI.

5. The system of claim 3 further comprising means for buffering the treated water.

6. The system of claim 5 wherein the metal is chromium VI.

7. The system of claim 5 further comprising means for adding a carbon source in a solid form to the treated water.

8. The system of claim 7 wherein the metal is chromium VI, molybdenum, cobalt, zinc, nickel, calcium, strontium, mercury and copper.

9. The system of claim 2 wherein the metal is chromium VI.

10. The system of claim 1 wherein the metal is chromium VI.

11. A process for remediation of a metal contaminated water comprising bioreduction and bioaccumulation of a metal from the metal contaminated water a using a living *S. cerevisiae* cell biomass, said process comprising steps:
  (a) contacting the metal contaminated water with a biomass of nonpathogenic, metal tolerant live *S. cerevisiae* cells at a temperature from about 4° C. to about 100° C., said biomass being added to the water in an amount from about 2 g to about 100 g/L to form a water biomass mixture;
  (b) reacting said water/biomass mixture for about 4 to about 100 hours at a continuous temperature from about 4° C. to about 100° C. in the presence of a carbon source at pH from about 2 to about 9, thereby achieving the bioreduction and bioaccumulation of said metal with said biomass; and
  (c) separating the remediated water from said biomass.

12. The process of claim 11 wherein the metal is complexed with the cell biomass.

13. The process of claim 12 wherein the cell biomass/metal complex is precipitated.

14. A process for remediation of a chromium VI contaminated water comprising contacting said contaminated water with living *S. cerevisiae* cells under anaerobic conditions at a temperature from about 4° C. to about 100° C. for about 4 to about 100 hours at pH from about 2 to about 9, thereby achieving the bioreduction of said chromium VI to chromium III and bioaccumulation of said chromium III.

15. The process of claim 14 further comprising separation of said remediated water from said *S. cerevisiae* cells.

16. The process of claim 15 wherein said temperature is about 15° C. to 45° C.

17. The process of claim 16 wherein said pH is about 6.5 to 7.8.

18. The process of claim 17 wherein the amount of *S. cerevisiae* biomass is about 8 g per liter of treated water.

19. The process of claim 18 wherein the water in step (a) is heated to a temperature of from about 15° C. to about 35° C.

20. The process of claim 19 wherein the water in step (a) is heated to a temperature of from about 25° C. to about 35° C.

21. The process of claim 20 wherein the water in step (a) is additionally buffered with sodium hydroxide, carbonate, bicarbonate or phosphate buffer to pH from about 6.5 to about 7.8.

22. The process of claim 21 wherein the water is buffered to neutral pH.

23. The process of claim 22 wherein a carbon source is added to the treated water in amount of from about 10 nM to about 1000 nM.

24. The process of claim 23 wherein the carbon source is glucose.

25. The process of claim 24 wherein the carbon source is glucose which is added in concentration from about 50 nM to about 500 nM.

26. The process of claim 25 wherein the glucose is added in concentration about 100 nM.

27. A process for remediation of a chromium VI contaminated water comprising contacting said contaminated water with living *S. cerevisiae* cells under aerobic conditions at a temperature from about 4° C. to about 100° C. for about 4 to about 100 hours at pH from about 2 to about 9, thereby achieving the bioreduction of said chromium VI to chromium III and the bioaccumulation of said chromium III.

28. The process of claim 27 wherein the bioreduced chromium is precipitated.

29. A process for remediation of a chromium VI contaminated water comprising removal by bioreduction and bioaccumulation of said chromium from said contaminated water using a dead *S. cerevisiae* cell biomass, said process comprising:
  (a) contacting said contaminated water with a dead *S. cerevisiae* cell biomass at a temperature of from about 4° C. to about 100° C., said cell biomass being added to the water in an amount from about 2 g to about 100 g/L to form a water/biomass mixture;
  (b) reacting said water/biomass mixture for about 4 to about 100 hours at a continuous temperature from about 4° C. to about 100° C. at an acidic pH, thereby removing the chromium from the water into the cell biomass; and
  (c) separating the remediated water from the cell biomass.

30. The process of claim 29 wherein the *S. cerevisiae* biomass of step (a) is present in amount from about 4 g to about 15 g of *S. cerevisiae* cells per liter of treated water.

31. A process for remediation of a metal contaminated water comprising removal by bioreduction and bioaccumulation of said metal from said contaminated water using a dead *S. cerevisiae* cell biomass, said process comprising:
  (a) contacting said contaminated water with a dead *S. cerevisiae* cell biomass at a temperature of from about 4° C. to about 100° C., said cell biomass being added to the water in an amount from about 2 g to about 100 g/L to form a water/biomass mixture;
  (b) reacting said water/biomass mixture for about 4 to about 100 hours at a continuous temperature of from about 4° C. to about 100° C. at an acidic pH, thereby removing the metal from the water into the cell biomass; and
  (c) separating the remediated water from the cell biomass.

32. The process of claim 31 wherein the metal is selected from the group consisting of chromium, molybdenum, cobalt, zinc, nickel, calcium, strontium, mercury and copper.

33. The process of claim 32 wherein the *S. cerevisiae* biomass of step (a) is present in amount from about 4 g to about 15 g of *S. cerevisiae* cells per liter of treated water.

\* \* \* \* \*